US011485100B2

(12) United States Patent
Lechat et al.

(10) Patent No.: US 11,485,100 B2
(45) Date of Patent: Nov. 1, 2022

(54) METHOD FOR MANUFACTURING AN OPHTHALMIC ARTICLE

(71) Applicant: ESSILOR INTERNATIONAL, Charenton le Pont (FR)

(72) Inventors: Céline Lechat, Charenton le Pont (FR); Julien Hubert, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 361 days.

(21) Appl. No.: 16/464,813

(22) PCT Filed: Oct. 27, 2017

(86) PCT No.: PCT/EP2017/077619
§ 371 (c)(1),
(2) Date: May 29, 2019

(87) PCT Pub. No.: WO2018/099660
PCT Pub. Date: Jun. 7, 2018

(65) Prior Publication Data
US 2019/0315080 A1 Oct. 17, 2019

(30) Foreign Application Priority Data

Nov. 30, 2016 (EP) .................. 16306589

(51) Int. Cl.
B29D 11/00 (2006.01)
B29L 11/00 (2006.01)

(52) U.S. Cl.
CPC .... B29D 11/00961 (2013.01); B29D 11/0073 (2013.01); B29D 11/00865 (2013.01); B29D 11/00942 (2013.01); B29L 2011/0016 (2013.01)

(58) Field of Classification Search
CPC .......... B29D 11/00961; B29D 11/0073; B29D 11/00865; B29D 11/00942
See application file for complete search history.

(56) References Cited

U.S. PATENT DOCUMENTS 4,980,993 A 1/1991 Umezaki
8,062,444 B2 11/2011 Begon et al.
(Continued)

FOREIGN PATENT DOCUMENTS

KR 2016 0029107 3/2016
WO WO 2016/050644 4/2016

OTHER PUBLICATIONS

International Search Report, PCT/EP2017/077619, dated Jan. 24, 2018.

Primary Examiner — Mathieu D Vargot
(74) Attorney, Agent, or Firm — Nixon & Vanderhye

(57) ABSTRACT

Disclosed is a method for manufacturing an ophthalmic article including a substrate and a functional wafer securely fastened to a first curved face of the substrate, the manufacturing method including the steps of providing the functional wafer preformed according to a first desired shape, the preformed functional wafer having a first preformed face intended to be applied on the first curved face of the substrate, the first preformed face being defined by first geometrical characteristics; determining second geometrical characteristics of the first curved face of the substrate to be manufactured according to the first geometrical characteristics of the first preformed face of the preformed functional wafer; manufacturing the first curved face according to the second geometrical characteristics determined; fixing the preformed functional wafer to the manufactured substrate by applying the first preformed face on the first curved face in order to form the ophthalmic lens.

18 Claims, 8 Drawing Sheets

(56) References Cited

U.S. PATENT DOCUMENTS

| | | |
|---|---|---|
| 8,349,113 B2 | 1/2013 | Bovet et al. |
| 9,050,755 B2 | 6/2015 | Herod et al. |
| 2001/0035935 A1* | 11/2001 | Bhalakia ............... B32B 27/08 |
| | | 264/1.32 |
| 2003/0017340 A1 | 1/2003 | Jiang et al. |
| 2007/0195422 A1 | 8/2007 | Begon et al. |
| 2009/0273756 A1 | 11/2009 | Vu |
| 2011/0299031 A1* | 12/2011 | Keane ..................... G02C 7/02 |
| | | 351/159.75 |
| 2012/0147322 A1 | 6/2012 | Begon et al. |
| 2012/0267030 A1 | 10/2012 | Hall et al. |
| 2014/0085627 A1 | 3/2014 | Chauveau |
| 2015/0241714 A1* | 8/2015 | Allione ................. B33Y 10/00 |
| | | 351/159.73 |

\* cited by examiner

METHOD FOR MANUFACTURING AN OPHTHALMIC ARTICLE

FIELD OF THE INVENTION

The invention relates in general to the manufacture of ophthalmic articles that comprise an ophthalmic substrate and a functional wafer securely fastened to a curved face of said ophthalmic substrate.

BACKGROUND ART

The functional wafers, or films, used to coat ophthalmic lenses are sometimes flat in their initial state, for reasons of ease of manufacture of these films; methods for gluing an initially flat functional wafer or film to a curved face of a substrate are already known.

In these methods, to prevent defects appearing in the film, the film is preformed using a cold, or preferably hot (thermoforming), method to give it an appropriate initial curvature, before being applied to the substrate.

In particular, U.S. Pat. Nos. 8,062,444 and 8,349,113 propose methods for applying a film on a substrate.

SUMMARY OF THE INVENTION

The invention is directed to a method for manufacturing an ophthalmic article, when the functional wafer is preformed and next applied.

The invention accordingly provides a method for manufacturing an ophthalmic article comprising a substrate and a functional wafer securely fastened to a first curved face of said substrate, said manufacturing method comprising the steps of:
- providing said functional wafer preformed according to a first desired shape, the preformed functional wafer having a first preformed face intended to be applied on said first curved face of said substrate, said first preformed face being defined by first geometrical characteristics;
- determining second geometrical characteristics of the first curved face of said substrate to be manufactured according to the first geometrical characteristics of said first preformed face of said preformed functional wafer;
- manufacturing said first curved face according to the second geometrical characteristics determined;
- fixing said preformed functional wafer to said manufactured substrate by applying the first preformed face on the first curved face in order to form said ophthalmic lens.

The method according to the invention allows to provide an ophtalmic substrate having a first curved face which is specifically designed and conformed to the face of the preformed functional wafer intended to be applied on said first curved face.

Said otherwise, the method according to the invention involves adapting the first curved face to the first geometrical characteristics of the first preformed face. The functional wafer is not chosed, amongst wafers of given desired shapes, based on a geometrical characteristics of the first curved face of the substrate.

In particular, in case the forming of the functional wafer induces a first preformed face slightly different from the first desired shape, the first curved face of the substrate is machined to be exactly conformal to said first preformed face (and not to the first desired shape). It is thus possible to reduce or even avoid the stress build-up that might otherwise be formed in the wafer due to this slight difference between the shape of the first curved substrate and the geometrical characteristics of the first preformed face.

It will be noted that by contrast (that is to said the method according to the invention is not applied), the wafer is generally chosen according to the shape of the curved face of the substrate, or the substrate is chosen based on the desired shape of the wafer, and they are assembled to form an optical article.

However, the inventors have found that when submitting the optical article obtained to a heating step, the substrate can be deformed. In particular, the inventors have found that the geometrical characteristics of the first preformed face may often differ from the desired shape. This difference may happen due to stress left from the preforming method or may have other sources.

In methods that does not apply the steps of the method according to the invention, and especially after the fixing step, the shape of the optical article obtained corresponds to the shape of the substrate and some stress is stored into the wafer fixed to the substrate. Upon heating, for example during a tinting step, or during a curing step for curing a coating applied on the optical article obtained, or during any other heating phase, the substrate softens more than the wafer so that the latter may relax the stored stress thanks to the deformation of the substrate.

By contrast, thanks to the method according to the invention, the minute divergences of the first geometrical characteristics of the wafer with regard to the desired shape are taken into account for manufacturing the first curved surface of the substrate and inherently for manufacturing the optical article. Thus, when the wafer is fixed to the substrate, no stress or only reduced stress into the wafer is generated.

In other words, the geometrical parameters defining the first curved face of the ophtalmic substrate are determined so that the shape thereof perfectly matches with or is at least the closest as possible to the shape of the face of the preformed functional wafer.

In particular, the first geometrical characteristics of said first preformed face of said preformed functional wafer is complementary with the second geometrical characteristics of the first curved face of the substrate to be manufactured.

The geometrical parameters defining the face of the preformed functional wafer may be known or measured thanks to a geometrical measurement device.

The fact that the shape of the first curved face of the ophtalmic substrate matches with the shape of the face of the preformed functional wafer improves the step of laminating the preformed functional wafer and the designed and manufactured ophtalmic substrate.

The wafer can be a film, which is preferably made from a deformable material, such as a polymer film or even comprise a stack of such polymer films, or a shell which is made from a mineral material, such as a glass shell, or an electrochromic cell comprising a liquid or gel phase inbetween two glass shell, or other examples of mineral shells.

The wafer can also be formed by holographic films or mirrors, light guides, pixelated films, films or shells comprising liquid crystals or intended to comprise liquid crystals. Such wafers are more generally formed by active optical elements.

Furthermore, the method according to the invention limits stresses and constraints generated in the functional wafer at least during the fixing step.

The fixing step can be a lamination step in particular when the wafer is a film which is deformable.

The fixing step can be a gluing step, without lamination, in particular when the wafer comprises a mineral shell which is not deformable.

The preformed functional wafer may be configured to provide a very wide range of functions, for example an anti-shock function, an anti-scratch function, an anti-reflection function, a mirror function, a polarizing function, a color-filtering function, a function of filtration configured for modulating the transmission curve, the filtration being selective or not, a photochromic function, an electrochemical function, an antistatic function, an anti-smudge, an anti-fogging or anti-rain function, a bonding function, a light guide function, an image generation function or the combination of a plurality of these functions.

The ophthalmic substrate may be a semi-finished lens having the first curved face designed and manufactured according to the invention and a second curved face comprising ophthalmic properties or a blank having the first curved face and optionally the second curved face to design and manufacture.

In particular, the ophthalmic substrate can be a semi-finished lens prior to having the first curved surface manufactured according to the first geometrical characteristics.

The substrate may have a second surface which is machined according to geometrical characteristics determined for providing the optical article with a predetermined prescription before or after the fixing step.

Alternatively, the ophthalmic substrate may be a finished lens with an unfinished first curved surface, the manufacturing of the first curved surface being then obtained by molding or casting by using a mold, the surface of which being adapted to the first geometrical characteristics of the wafer.

Alternatively, the substrate can be a support for an ophthalmic lens without prescription, generally said plano lens used for instance in order to form solar lens. In this case, the substrate may intrinsically comprise a predetermined function, for instance of filtration.

The first curved face on which the preformed functional wafer is applied can be concave or convex.

The assembly comprising the substrate and the wafer applied on the substrate forms the ophthalmic lens (corrective or no-corrective). As stated above, a corrective ophthalmic lens includes here the case where the optical article obtained after the fixing step is a semi-finished lens with a second surface available for machining.

The fixing step, including gluing by lamination step or not, is here mentioned as applying directly the wafer on the first curved face of the substrate. According to the invention, it is understood that the first curved face is either nude or it may already have at least one initial film or coating. Such film or coating may have functional properties chosen amongst the functions mentioned above.

According to features preferred as being very simple, convenient and economical for embodying the method according to the invention:

the method comprises the step of determining the first geometrical characteristics of said first preformed face;

determining said first geometrical characteristics is performed with a geometrical measurement device using for instance a three-dimensionals technology or a deflectometry technology;

the method comprises the steps of measuring said first geometrical characteristics, comparing said first geometrical characteristics to predetermined geometrical characteristics defining said first desired shape in order to determine a wafer geometry error between said first geometrical characteristics and said predetermined geometrical characteristics; and said second geometrical characteristics of the first curved face of said substrate to be manufactured are determined according to said wafer geometry error;

the method comprises the step of generating a manufacturing file from said second geometrical characteristics and configuring operational parameters for manufacturing said first curved face of said substrate;

manufacturing the first curved face of said substrate is performed by using a turning machine or an additive machine, the machine being configured to receive said operational parameters;

manufacturing the first curved face of said substrate is performed by using a molding machine provided with a mold part having an internal face formed according to said second geometrical characteristics; the first curved face being formed in said mold part thanks to injection molding technology or casting technology or additive manufacturing technology;

said substrate has a second curved face opposite to the first curved face and the method further comprises the steps of determining third geometrical characteristics of said second curved face according to the first geometrical characteristics of said first preformed face of said preformed functional wafer and/or to the second geometrical characteristics of said first curved face, and manufacturing said second curved face according to the third geometrical characteristics determined;

the method comprises the step of providing a supplemental functional wafer preformed according to a predetermined shape, the preformed supplemental functional wafer having a supplemental first preformed face intended to be applied on the second curved face of said substrate, said supplemental first preformed face being defined by supplemental first geometrical characteristics, said second geometrical characteristics of said first curved face and/or said third geometrical characteristics of said second curved face being also determined according to said supplemental first geometrical characteristics; and the step of fixing said preformed supplemental functional wafer with said manufactured substrate by applying the supplemental first preformed face on the second curved face in order to form said ophthalmic lens;

at least one of said preformed functional wafer and manufactured substrate has an adhesive layer for fixing thereof;

the method comprises the step of providing positioning marks on at least one of said preformed functional wafer and manufactured substrate and furthermore positioning said preformed functional wafer with respect to said manufactured substrate according to said positioning marks for fixing thereof;

the predetermined shape of said functional wafer is defined at least by a radius of curvature; and/or the method comprises the step of preforming said functional wafer by thermoforming and/or by applying a gradient of pressure.

The invention furthermore relates to a system comprising system parts configured for executing the steps of the method as described above; and to a program comprising instructions configured to perform the steps of the method described above when said program is installed and executed in the system described above.

BRIEF DESCRIPTION OF THE DRAWINGS

The description of the invention now continues with a detailed description of preferred embodiments given hereinafter by way of non-limiting example and with reference to the appended drawings. In these drawings.

DETAILED DESCRIPTION OF PREFERRED EMBODIMENTS

Figure 1:
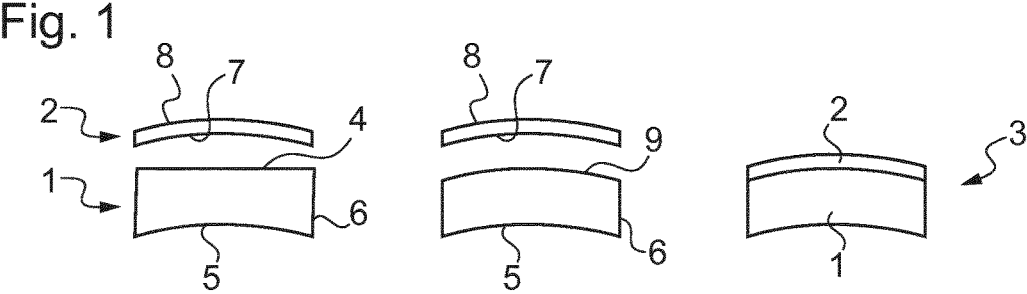
FIGS. 1 to 5 represent schematically steps of manufacturing of an ophthalmic article formed by the assembling of at least one wafer and a substrate, according to different embodiments of the invention.

FIG. 1 shows an ophthalmic substrate 1 and a wafer 2, which are provided, then at least partially modified and then assembled to form an ophthalmic article 3 such as an ophthalmic lens.

The ophthalmic substrate 1 and the wafer 2 are here made from plastic material adapted to be used in the ophthalmic field.

Initially, the ophthalmic substrate 1 has a first face 4 which is here substantially planar, a second curved face 5, opposite to the first face 4, which is here concave, and a peripheral edge 6 which joins both the first and second faces 4 and 5.

The ophthalmic substrate 1 is here a blank lens having the first face 4 to be designed and manufactured according to the wafer 2 (see below) and the second curved face 5 also to be designed and manufactured to provide ophthalmic properties by combination with the first face manufactured according to the wafer 2.

In variant, the first face 4 is initially curved rather than planar, and is designed and manufactured also to have a base curvature for providing a match to some eyeglass frames or to provide an easy manufacturing of some range of prescription by designing and manufacturing the second surface, but is not initially designed on the basis on the first geometry of the first preformed surface of wafer 2. The ophthalmic substrate is in this case like a semi-finished lens as regard the ophthalmic properties.

It will be noted that the initial semi-finished lens can be obtained by molding, by turning or by additive manufacturing.

In the above mentioned cases, to provide a predetermined prescription, or to provide non-prescription glasses, the second face of the blank or of the semi-finished has to be designed and manufactured by taking into account the shape of the first surface once designed and manufactured according to the shape of the wafer 2.

The wafer 2 is a preformed functional wafer which has a first preformed face 7 intended to be applied on the substrate 1, on the side of the first face 4, and a second face 8 opposite to the first preformed face 7.

The wafer 2 can be a film, which is preferably made from a deformable material, or a shell which is made from a mineral material.

The preformed functional wafer 2 may be configured to provide a very wide range of functions, for example an anti-shock function, an anti-scratch function, an anti-reflection function, a mirror function, a polarizing function, a color-filtering function, a function of filtration configured for modulating the transmission curve, the filtration being selective or not, a photochromic function, an electrochemical function, an antistatic function, an anti-smudge, an anti-fogging or anti-rain function, a bonding function, a light guide function, an image generation function or the combination of a plurality of these functions.

Then, the first face 4 of the ophthalmic substrate 1 is manufactured in order to obtain a first desired curved surface 9 which has a complementary shape with the shape of the first preformed face 7. The first curved face 9 is here convex.

In FIG. 1, the first face 4 of the ophthalmic substrate 1 is machining by turning.

The first curved face 9 is thus specifically designed and conformed to the face 7 of the preformed functional wafer 2 intended to be applied on the first curved face 9. Here, the face 7 is thus concave.

In other words, the second geometrical parameters defining the first curved face 9 of the ophtalmic substrate 1 are determined so that the shape thereof perfectly matches with or is at least the closest as possible to the shape of the face 7 of the preformed functional wafer 2.

Closest as possible means closest as possible based on the technical means used to conform the first curved face. Indeed the matching of the first curved face 9 and the face 7 of the preformed functional wafer 2 is considered as closest as possible if there are no difference in shape of greater amplitude than the accurancy tolerance or tolernce limit allowable in the manufacturing method of ophtalmic lens. The tolerance is here defined to quantify a gradient between a geometry obtained thanks to a manufacturing machine and a theoretical desired geometry sent to this machine under the form of a manufacturing file and configuring parameters.

It will be noted that the first preformed face 7 of the wafer 2 is defined by first geometrical characteristics, which may be known or measured thanks to a geometrical measurement device (see below), and that the first curved face 9 of the ophtalmic substrate 1 is defined by the second geometrical characteristics, which are thus complementary with the first geometrical characteristics.

Then, the first preformed face 7 of the wafer 2 and the first curved face 9 of the ophtalmic substrate 1 are faced, put into contact and fixed together in a securely fastened manner.

The assembly comprising the substrate 1 and the wafer 2 applied on the substrate 1 forms the ophthalmic lens 3 (semi-finished, corrective or no-corrective). For instance, the assembly may form a semi-finished lens which needs to have the second surface of the substrate designed and manufactured according to the second geometric characteristics and according to a predetermined prescription before forming a finished corrective or no-corrective ophthalmic lens. Alternatively the assembly may form a finished corrective or no-corrective ophthalmic lens if the second surface is thus designed and manufactured.

The fact that the shape of the first curved face 9 of the ophtalmic substrate 1 matches with the shape of the face 7 of the preformed functional wafer 2 improves the assembling of the preformed functional wafer 2 and the designed and manufactured ophtalmic substrate 1; and limits stresses and constraints generated in the functional wafer 2 at least during the fixation of the substrate 1 and wafer 2.

Figure 2:
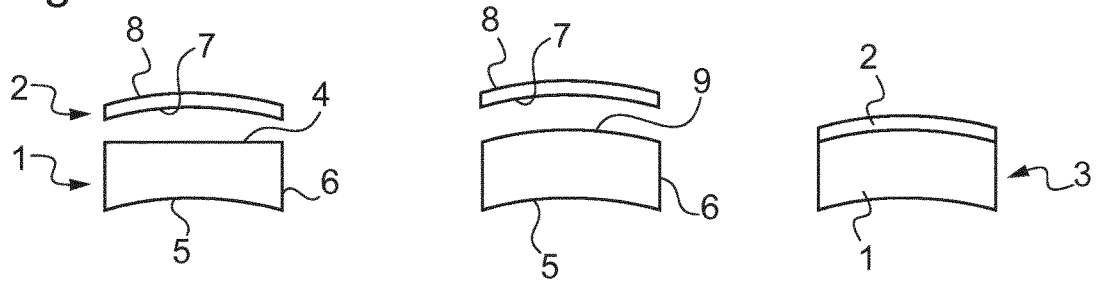

FIG. 2 is similar to FIG. 1 except that the first face 4 of the ophthalmic substrate 1 is directly formed by additive manufacturing, rather than machining by turning.

It will be noted that the additive manufacture corresponds here to a method of three-dimensional printing, or of stereolithography, or else of thermoplastic filament extrusion.

Furthermore, the additive manufacturing machine is here configured to deposit by juxtaposition a plurality of predetermined volume elements, for example forming superposed layers (stated otherwise layer by layer), of at least one material on the first face 4 of the substrate 1 so as to form the first curved face 9.

Each volume element is defined by a predetermined composition and a predetermined size. As one is dealing here with additive manufacture and in particular with three-dimensional printing, one also speaks of volumetric element, or volume element, also called a voxel (representative of a pixel in three dimensions).

It will be noted that the first face 4 may initially be relatively flat or may already have a base curvature.

Figure 3:
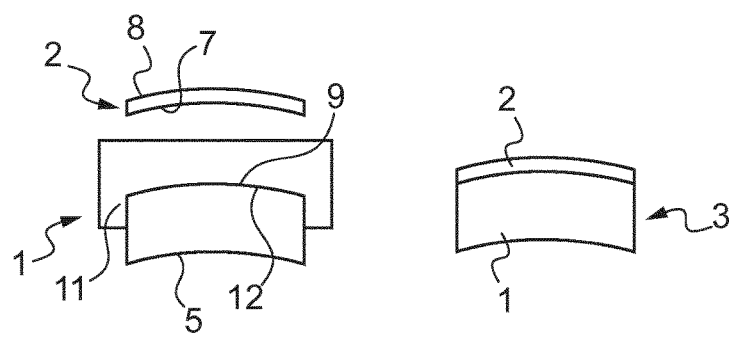

FIG. 3 is similar to FIGS. 1 and 2 except that the first face 4 of the ophthalmic substrate 1 is formed according to the second geometric characteristics by molding, rather than machining by turning or direct additive manufacturing.

The ophthalmic substrate 1 is produced into a mold part 11. The mold 11 has an internal molding face 12 designed to mold the first face 9 of the ophthalmic substrate 1. Here, the internal molding face 12 is formed so as to provide a first curved face 9 of the molded substrate having the second geometrical characteristics.

The internal molding face 12 can be fully designed based on the knowledge of the first geometrical characteristics. Alternatively, it can be modified from a base molding surface according to the first geometrical characteristics. Such modification may be permanent, for example if the first geometrical characteristics is repeatable for multiple wafers, or it may be semi-permanent, the internal molding face being modified using additive manufacturing technologies for example.

The molding can be carried out by different technologies, for instance by one amongst injection molding, casting or additive manufacturing.

The molded ophthalmic substrate 1 may be a finished lens, for which the second surface of the ophthalmic substrate 1 has been designed and manufactured according to a predetermined prescription and to the second geometrical characteristics of the first surface, i.e. directly or indirectly based on the first geometrical characteristics.

Alternatively, the molded ophthalmic substrate 1 may be a semi-finished lens for which only the first surface is designed based on the first geometrical characteristics, while the second surface is designed to be further manufactured, by turning or additive manufacturing, based on a yet-undetermined prescription.

As exemplified in this embodiment, but applying to other embodiments, the functional wafer may be formed for instance by a holographic film. As mentioned above, risks of deformation due to thermal relaxation of the material of the substrate is reduced so that deformation of the optical function brought by the substrate is limited. Furthermore, the film itself is also protected during the lamination step. In particular, when the functional wafer has a different curvature than the substrate, stress is generally also applied to the functional wafer, so that reducing the stresses applied to the substrate thus also reduces stresses to the functional wafer. This is very convenient to protect functional wafers which are fragile and/or which have properties that may be modified when stressed.

This is very convenient for applying an already pre-recorded holographic film to a curved ophthalmic substrate, in particular for augmented reality applications in which the hologram thus provided has an optical combiner function. It is to be noted that when the hologram is pre-recorded on the film, forming a holographic mirror, it has an optical function of the optical combining type, which reflects towards the eye an image coming from a projector placed on a spectacle frame. It is also to be noted that deformation of this hologram, for example during its lamination on the substrate, may generally generate a detrimental variation of the optical power in reflection. For example, if the holographic mirror is curved further when he is applied on the substrate (in others words when he is more concave as seen from the backside of the ophthalmic lens), then the position of the reflection of the image issued from the projector is changed, generating for example a distortion of the image or a loss of sharpness for the wearer observing the virtual image. It could therefore be difficult to use the prerecorded holographic film to generate a quality virtual image. However, as taught in the present invention, modifying the first curved face 9 of the ophthalmic substrate 1 according to the curvature of the functional wafer 2, here an holographic film, allows to ensure that the latter will not be deformed and therefore that the virtual image will be not be further damaged. In addition, the use of the invention to holographic films limits the application of stress on the holographic film which can induce variations of the holograms over time.

Another advantage is that the invention enables to produce standard holographic films, capable of covering a range of glass of different powers. More precisely, it is conceivable to define predetermined holograms on holographic films for a given series of film curvature. The ophthalmic substrates are then prepared by molding or surfacing the back surface 5 as a first curved surface 9, so as to fit the curvature of the holographic film whereas the front face 4 of the ophthalmic substrate is further molded or machined so as to provide a predetermined power prescription of the ophthalmic lens 3. It is thus possible, for ophthalmic lenses of different power, to have identical rear faces, and therefore to use a limited number of types of pre-recorded holographic films and still ensure an adequate vision of the virtual image for multiple prescription lenses.

Figure 4:
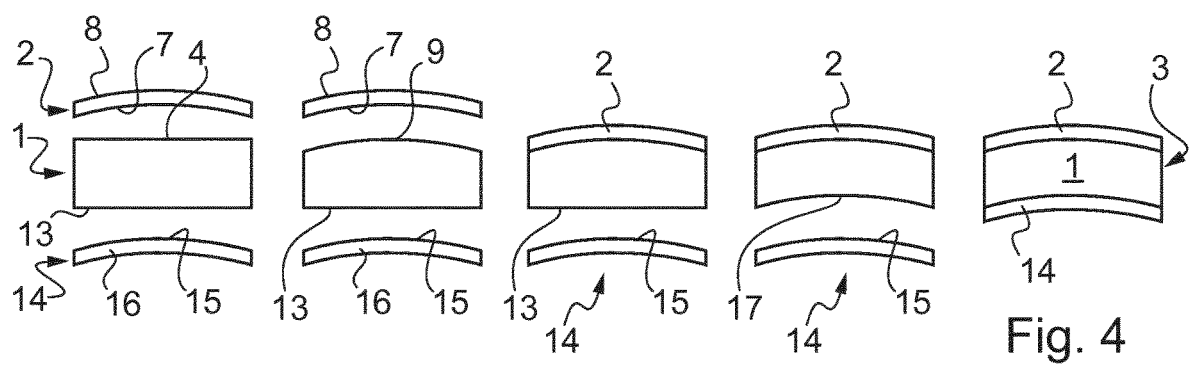

FIG. 4 is similar to FIG. 1 except that the ophthalmic substrate 1 has initially a second face 13 which is not curved but for instance substantially planar, like the first face 4.

Furthermore, a supplemental preformed functional wafer 14 is provided.

The supplemental wafer 14 is a preformed functional wafer which has a first preformed face 15 intended to be applied on the substrate 1, on the side of the second face 13, and a second face 16 opposite to the first preformed face 15.

The supplemental wafer 14 can be similar to the wafer 2 and made from a deformable material, or a core which is made from a mineral material.

The preformed functional wafer 14 may be configured to provide a very wide range of functions, for example an anti-shock function, an anti-scratch function, an anti-reflection function, a mirror function, a polarizing function, a color-filtering function, a function of filtration configured for modulating the transmission curve, the filtration being selective or not, a photochromic function, an electrochemical function, an antistatic function, an anti-smudge, an anti-fogging or anti-rain function, a bonding function, a light guide function, an image generation function or the combination of a plurality of these functions.

Preferably, the function provided by the supplemental wafer 14 is different to the function provided by the wafer 2.

The first face 4 of the ophthalmic substrate 1 is manufactured in order to obtain the first desired curved surface 9 which has a complementary shape with the shape of the first preformed face 7 of the wafer 2. In FIG. 4, the first face 4 of the ophthalmic substrate 1 is machining by turning.

The first curved face 9 is convex and the first preformed face 7 of the wafer 2 is thus concave.

The first curved face 9 is thus specifically designed and conformed to the face 7 of the preformed functional wafer 2 intended to be applied on the first curved face 9.

In some embodiments, the first curved face 9 specifically designed and conformed to the face 7 of the preformed functional wafer is concave.

In other words, the second geometrical parameters defining the first curved face 9 of the ophtalmic substrate 1 are determined so that the shape thereof perfectly matches with or is at least the closest as possible to the shape of the face 7 of the preformed wafer 2.

Next, the first preformed face 7 of the wafer 2 and the first curved face 9 of the ophtalmic substrate 1 are faced, put into contact and fixed together.

This enables to form a semi-finished lens, with the wafer 2 fixed to the first curved face and the second curved face of the ophthalmic substrate 1 being adapted to be manufactured.

Here, but generally optionally, the second face 13 of the ophthalmic substrate 1 can be manufactured in order to obtain a second desired curved surface 17 which has a complementary shape with the shape of the first preformed face 15 of the supplemental wafer 14. In FIG. 4, the second face 13 of the ophthalmic substrate 1 can also be machining by turning.

The second curved face 17 can be concave and the first preformed face 15 of the supplemental wafer 14 can be convex.

The second curved face 17 can be specifically designed and conformed to the face 15 of the supplemental preformed functional wafer 14 intended to be applied on the second curved face 17.

In other words, the third geometrical parameters defining the second curved face 17 of the ophtalmic substrate 1 can be determined so that the shape thereof perfectly can matches with or can be at least the closest as possible to the shape of the face 15 of the supplemental preformed functional wafer 14.

Then, the first preformed face 15 of the supplemental wafer 14 and the second curved face 17 of the ophtalmic substrate 1 can bee faced, put into contact and fixed together.

The assembly comprising the substrate 1, the wafer 2 and the supplemental wafer 14, both being applied on the substrate 1, forms the ophthalmic lens 3 (corrective or no-corrective).

The fact that the shape of the first curved face 9 of the ophtalmic substrate 1 matches with the shape of the face 7 of the preformed functional wafer 2, and that the shape of the second curved surface 17 of the ophtalmic substrate 1 matches with the shape of the face 17 of the supplemental preformed functional wafer 14, improves the assembling of both wafers 2 and 14 with the corresponding faces 9 and 17 of the ophtalmic substrate 1; and limits stresses and constraints generated in the wafers 2 and 14 at least during the respective fixation of the substrate 1 and wafers 2 and 14.

As mentioned above, the present invention may be applied to front face and/or back faces of ophthalmic substrates or lenses, and the functional wafers may be applied on either or both of those surfaces. Accordingly, in a variant to the embodiment above mentioned, a wafer may be applied on the back face (equated to face 13) of the ophthalmic substrate, whether or not it is applied to the front face (equated to face 9) of the ophthalmic substrate. In other words, any of the embodiments of the invention describing the first curved face 9 as the front face, convex, of the ophthalmic substrate also apply to having the first curved face 9 being rather a back face, concave, of the ophthalmic substrate or lens.

Figure 5:
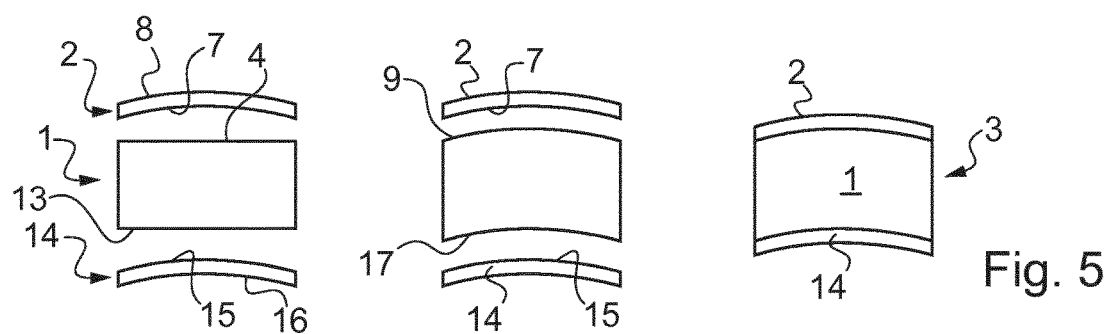

FIG. 5 is similar to FIG. 4 except that the first and second faces 4 and 13 of the ophthalmic substrate 1 are directly formed by additive manufacturing, rather than machining by turning, like in FIG. 2.

Furthermore, the first and second faces 4 and 13 are manufactured during a single step, successively or at the same time. Then, the wafers 2 and 14 are fixed, during a single step, successively or at the same time, on the respective first and second faces 4 and 13 of the ophthalmic substrate 1.

It will be noted that in the embodiments carried out according to FIGS. 1 to 5, the ophthalmic substrate 1 can initially a blank or a semi-finished lens or a finished lens as regard the prescription to provide to the ophthalmic article 3. When the substrate is a semi-finished lens or a finished lens, the manufacturing of the first and/or second faces of the substrate is carried out to so that the prescription already provided to the lens is maintained and more generally so that the ophthalmic properties of the substrate ae also maintained. When the substrate is a blank which is devoid of prescription, the manufacturing of the first and/or second faces of the substrate is carried out to provide the desired prescription and more generally desired ophthalmic properties.

Figure 6:
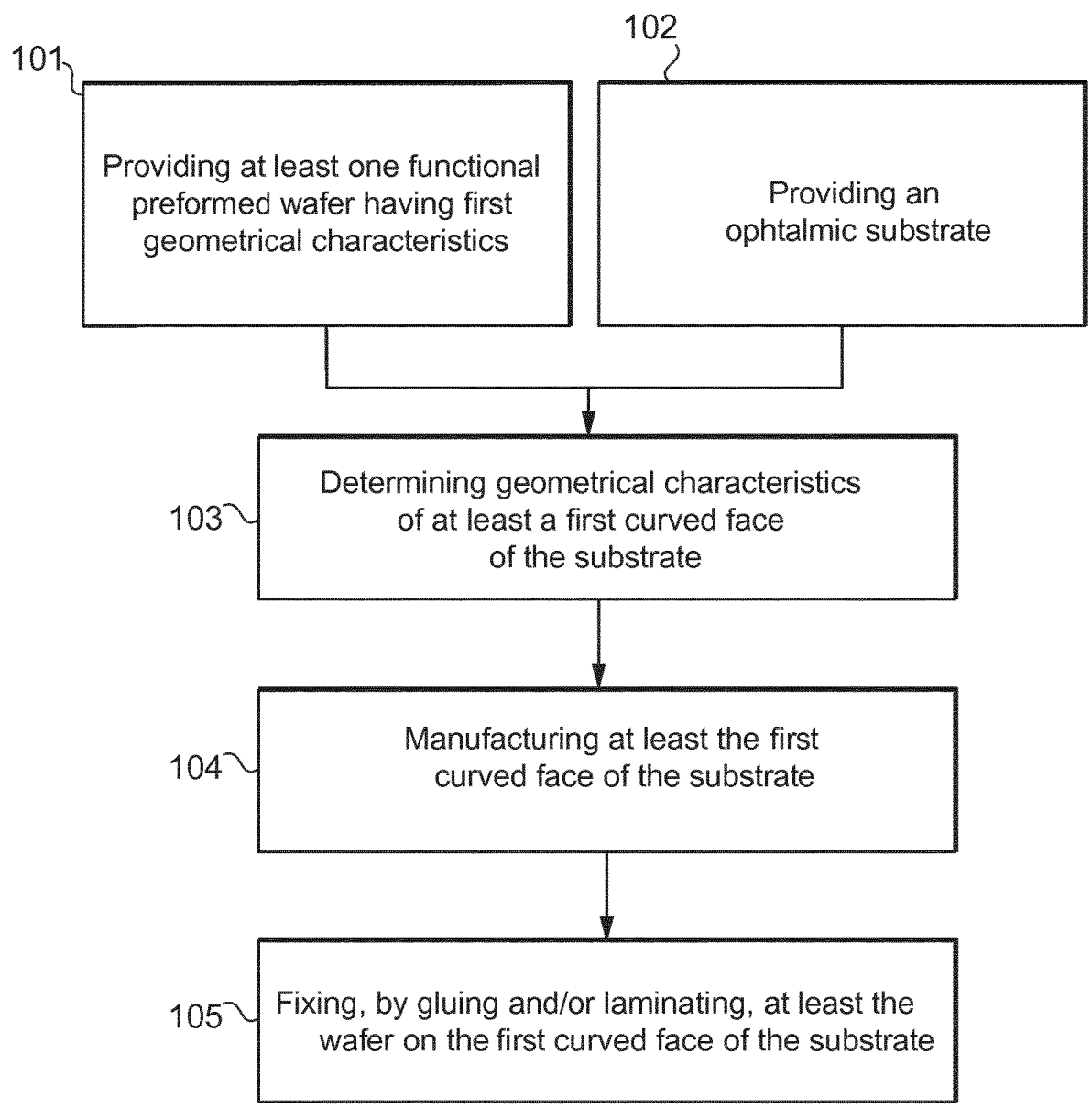
FIG. 6 is a flow chart showing steps of operation of the method according to the invention.

FIG. 6 shows the main steps of operation of the method to obtain an ophthalmic lens 3, for instance as described in reference to FIGS. 1 to 3.

The method for manufacturing the ophthalmic lens 3 as described above comprises the step 101 of providing the functional wafer 2 preformed according to a first desired shape.

As mentioned above, the preformed functional wafer 2 has its first preformed face 7 which is defined by the first geometrical characteristics.

The method further comprises the step 102 of providing the ophthalmic substrate 1, having at least its first face 4.

The method further comprises the step 103 of determining the second geometrical characteristics of the first curved face 9 to be manufactured at least according to the first geometrical characteristics of the first preformed face 7 of the preformed functional wafer 2.

The method further comprises the step 104 of manufacturing the first curved face 9 according to the second geometrical characteristics determined.

The method further comprises the step 105 of fixing the preformed functional wafer 2 to the manufactured substrate 1 by applying the first preformed face 7 on the first curved face 9 in order to form the ophthalmic lens 3.

The fixing step 105 can be a lamination step in particular when the wafer 2 is a film which is deformable.

In variant, the fixing step 105 can be a gluing step, without lamination, in particular when the wafer is a mineral shell which is not deformable, or for example if the wafer is an organic lens of thickness such that deforming it can be damaging.

The fixing step 105, including gluing by lamination or not, is here mentioned as applying directly the wafer 2 on the first curved face 9 of the substrate 1. It is understood that the first curved face 9 is either nude of it may already have at least one initial film or coating. Such film or coating may have functional properties choose amongst the functions mentioned above.

Furthermore, the fixing step 105 may include a positioning step of the preformed functional wafer 2 with respect to the manufactured substrate 1 according to positioning marks (see below).

It will be noted that, in variant, the method can also comprise a step of determining the third geometrical characteristics of a modified second curved face (not illustrated) to be manufactured, at least according to the first geometrical characteristics of the first preformed face 7 of the preformed functional wafer 2 and/or to the second geometrical characteristics of the first curved face 9.

The method further comprises the step 207 of manufacturing the second curved face 17 according to the third geometrical characteristics determined.

Figure 7:
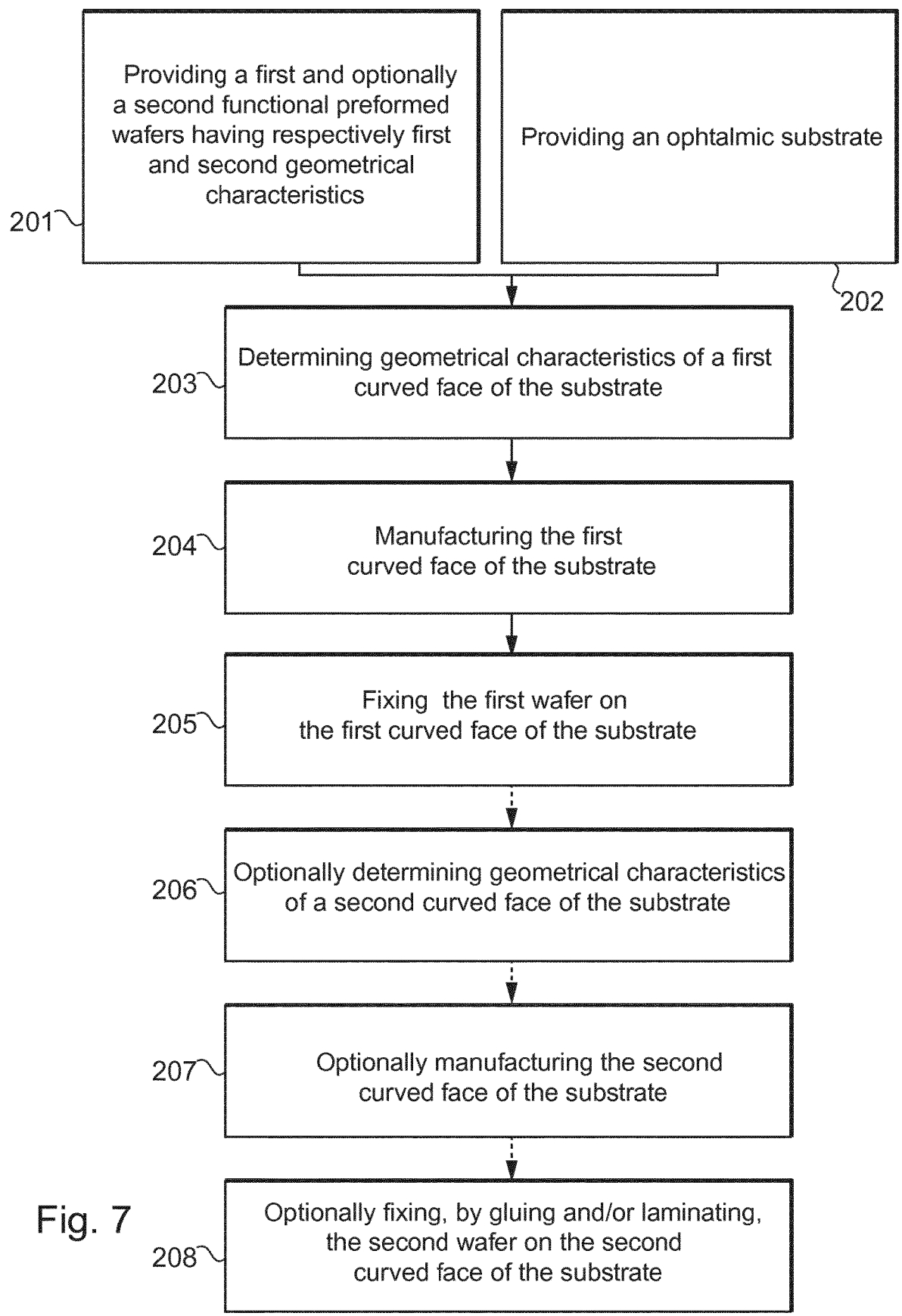
FIGS. 7 to 11 are flow charts showing different steps of operation of the method according to some examples of implementation of the invention.

FIG. 7 shows a particular embodiment to obtain an ophthalmic lens 3, for instance as described in reference to FIG. 4, which can optionally include a supplemental wafer fixed to the second curved face 17.

The method comprises the step 201 of providing the functional wafer 2 preformed according to a first desired shape and optionally the supplemental functional wafer 14 preformed according to a first supplemental desired shape.

The preformed functional wafer 2 has its first preformed face 7 which is defined by the first geometrical characteristics; while the optional supplemental preformed functional wafer 14 has its first preformed face 15 which is defined by the supplemental first geometrical characteristic.

The method further comprises the step 202 of providing the ophthalmic substrate 1, having its first face 4 and its second face 13.

The method further comprises the step 203 of determining the second geometrical characteristics of the first curved face 9 to be manufactured at least according to the first geometrical characteristics of the first preformed face 7 of the preformed functional wafer 2.

The step 203 can optionally take into consideration also the supplemental geometrical characteristics of the first preformed face 15 of the supplemental preformed functional wafer 14.

The method further comprises the step 204 of manufacturing the first curved face 9 according to the second geometrical characteristics determined.

The method further comprises the step 205 of fixing the preformed functional wafer 2 to the manufactured substrate 1 by applying the first preformed face 7 on the first curved face 9.

The fixing step 205 can be a lamination step in particular when the wafer 2 is a film which is deformable.

In variant, the fixing step 205 can be a gluing step, without lamination, in particular when the wafer is a mineral shell which is not deformable.

The method further optionally comprises the step 206 of determining the third geometrical characteristics of the second curved face 17 to be manufactured at least according to the supplemental first geometrical characteristics of the first preformed face 15 of the optional supplemental preformed functional wafer 14 and/or to the first geometrical characteristics of the first preformed face 7 of the preformed functional wafer 2 and/or to the second geometrical characteristics of the first curved face 9.

The method further optionally comprises the step 207 of manufacturing the second curved face 17 according to the third geometrical characteristics determined.

The method further optionally comprises the step 208 of fixing the supplemental preformed functional wafer 2 to the manufactured substrate 1 by applying the first preformed face 15 on the second curved face 17 in order to form the ophthalmic lens 3.

The fixing step 208 can be a lamination step in particular when the wafer 2 is a film which is deformable; or in variant, a gluing step, without lamination, in particular when the wafer is a mineral core which is not deformable.

The fixing step 208, including gluing by lamination or not, is here mentioned as applying directly the supplemental wafer 14 on the second curved face 17 of the substrate 1. It is understood that the second curved face 17 is either nude of it may already have at least one initial film or coating. Such film or coating may have functional properties choose amongst the functions mentioned above.

Figure 8:
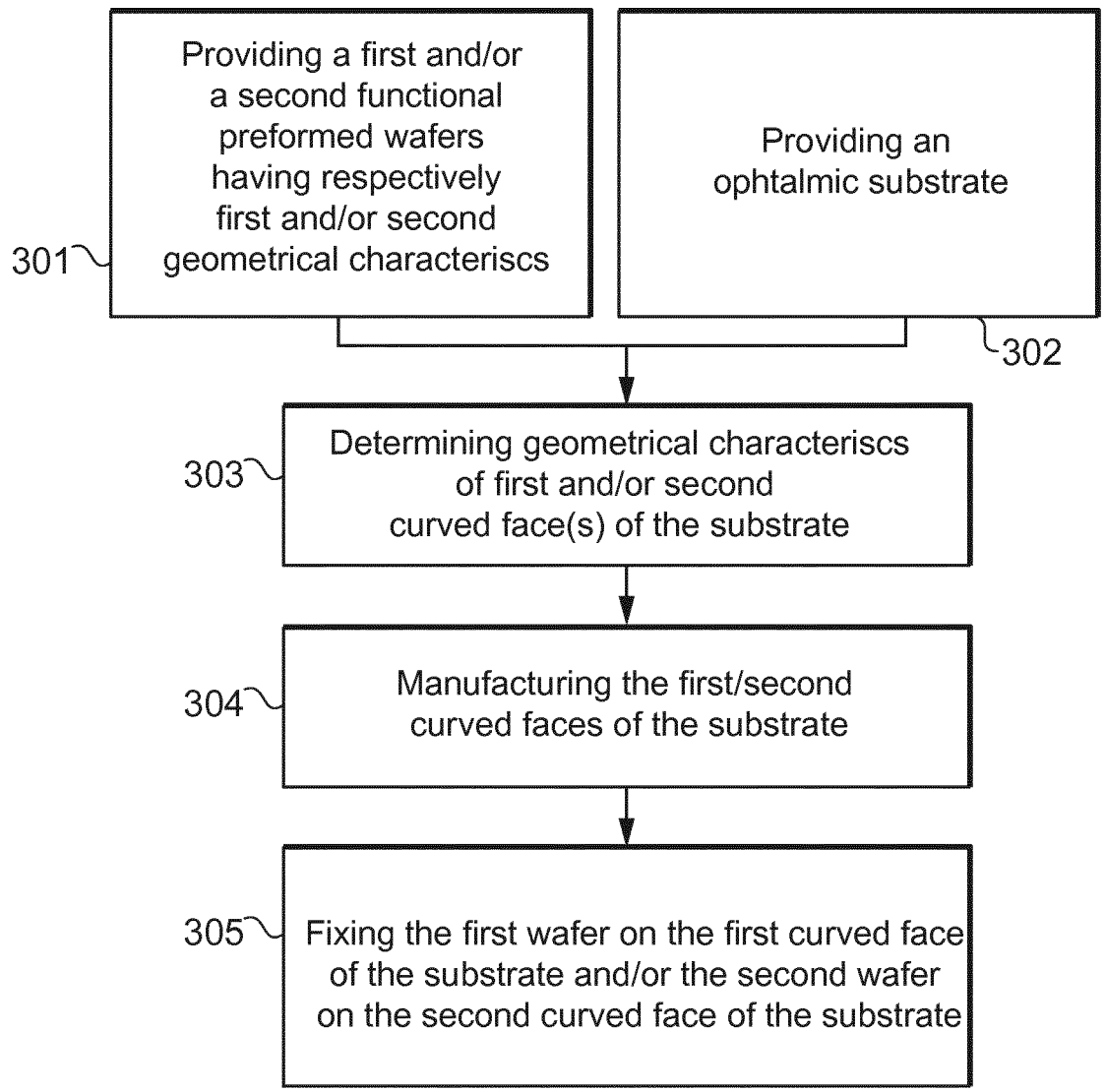

FIG. 8 shows a particular embodiment to obtain an ophthalmic lens 3, for instance as described in reference to FIG. 5.

The method comprises the step 301 of providing the functional wafer 2 preformed according to a first desired shape and also optionally the supplemental functional wafer 14 preformed according to a first supplemental desired shape.

The preformed functional wafer 2 has its first preformed face 7 which is defined by the first geometrical characteristics; while the optional supplemental preformed functional wafer 14 has its first preformed face 15 which is defined by the supplemental first geometrical characteristics.

The method further comprises the step 302 of providing the ophthalmic substrate 1, having its first face 4 and its second face 13.

The method further comprises the step 303 of determining both the second geometrical characteristics of the first curved face 9 to be manufactured at least according to the first geometrical characteristics of the first preformed face 7 of the preformed functional wafer 2 and optionally to the supplemental geometrical characteristics of the first preformed face 15 of the supplemental preformed functional wafer 14; and the third geometrical characteristics of the second curved face 17 to be manufactured at least according to the first geometrical characteristics of the first preformed face 7 of the preformed functional wafer 2 and/or to the second geometrical characteristics of the first curved face 9 and/or to the supplemental first geometrical characteristics of the first preformed face 15 of the supplemental preformed functional wafer 14.

The method further comprises the step 304 of manufacturing both the first curved face 9 according to the second geometrical characteristics determined and the second curved face 17 according to the third geometrical characteristics determined.

The method further comprises the step 305 of fixing the preformed functional wafer 2 to the manufactured substrate 1 by applying the first preformed face 7 on the first curved face 9; and optionally of fixing the optional supplemental preformed functional wafer 2 to the manufactured substrate 1 by applying the first preformed face 15 on the second curved face 17 in order to form the ophthalmic lens 3.

The fixing step 305 can be a lamination step in particular when the wafer 2 is a film which is deformable; or in variant, the fixing step 205 can be a gluing step, without lamination, in particular when the wafer is a mineral shell which is not deformable or another kind of wafer of organic glass for which any deformation would lead to damaging said wafer.

Figure 9:
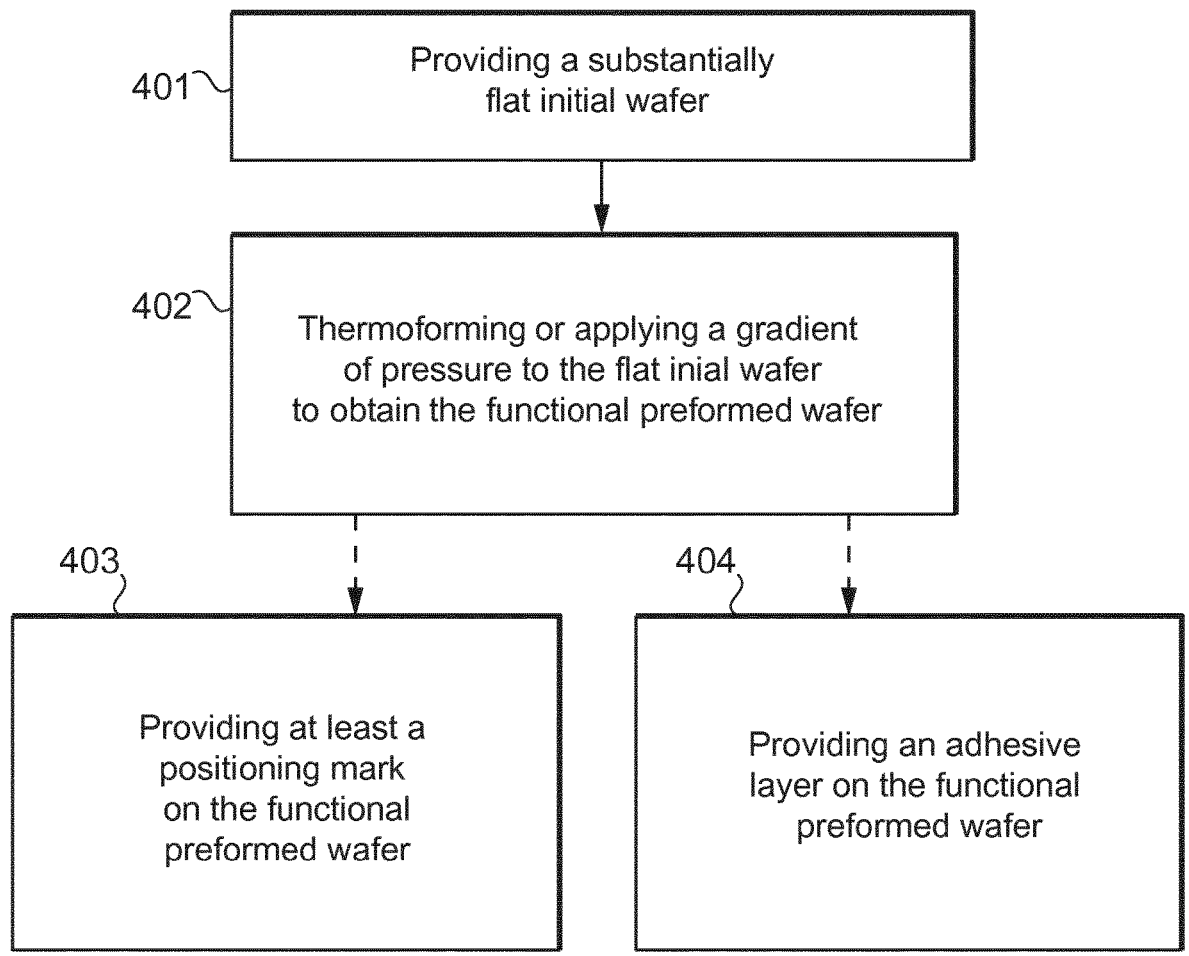

FIG. 9 shows a particular embodiment to obtain a preformed functional wafer 2 and/or a supplemental preformed functional wafer 14.

The method comprises the step 401 of providing a substantially flat initial wafer (not illustrated).

The method further comprises the step 402 of thermoforming and/or applying a gradient of pressure to the substantially flat initial wafer in order to preform the functional wafer into a predetermined shape and thus obtain the preformed functional wafer 2 and optionally a supplemental preformed functional wafer 14.

It will be noted that the predetermined shape respectively of the wafer 2 and 14 is defined at least by a radius of curvature.

The method further comprises the step 403 of providing at least one positioning mark (not illustrated) on the preformed functional wafer 2 and optionally on the supplemental preformed functional wafer 14, to facilitate the fixing step described above.

The method optionally comprises the step 404 of providing an adhesive layer on the preformed functional wafer 2 and optionally on the supplemental preformed functional wafer 14, also to facilitate the fixing step described above.

Figure 10:
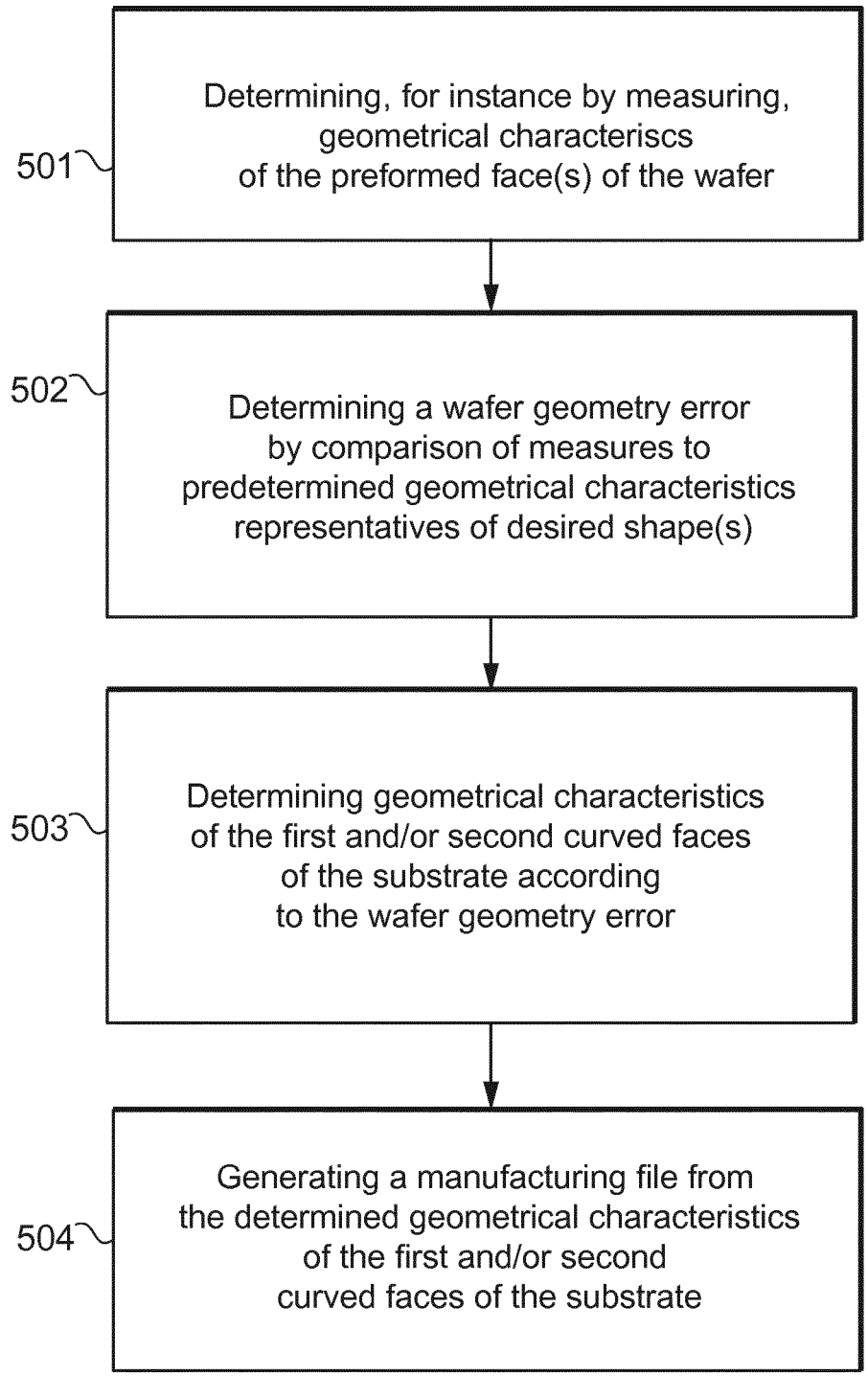
Figure 11:
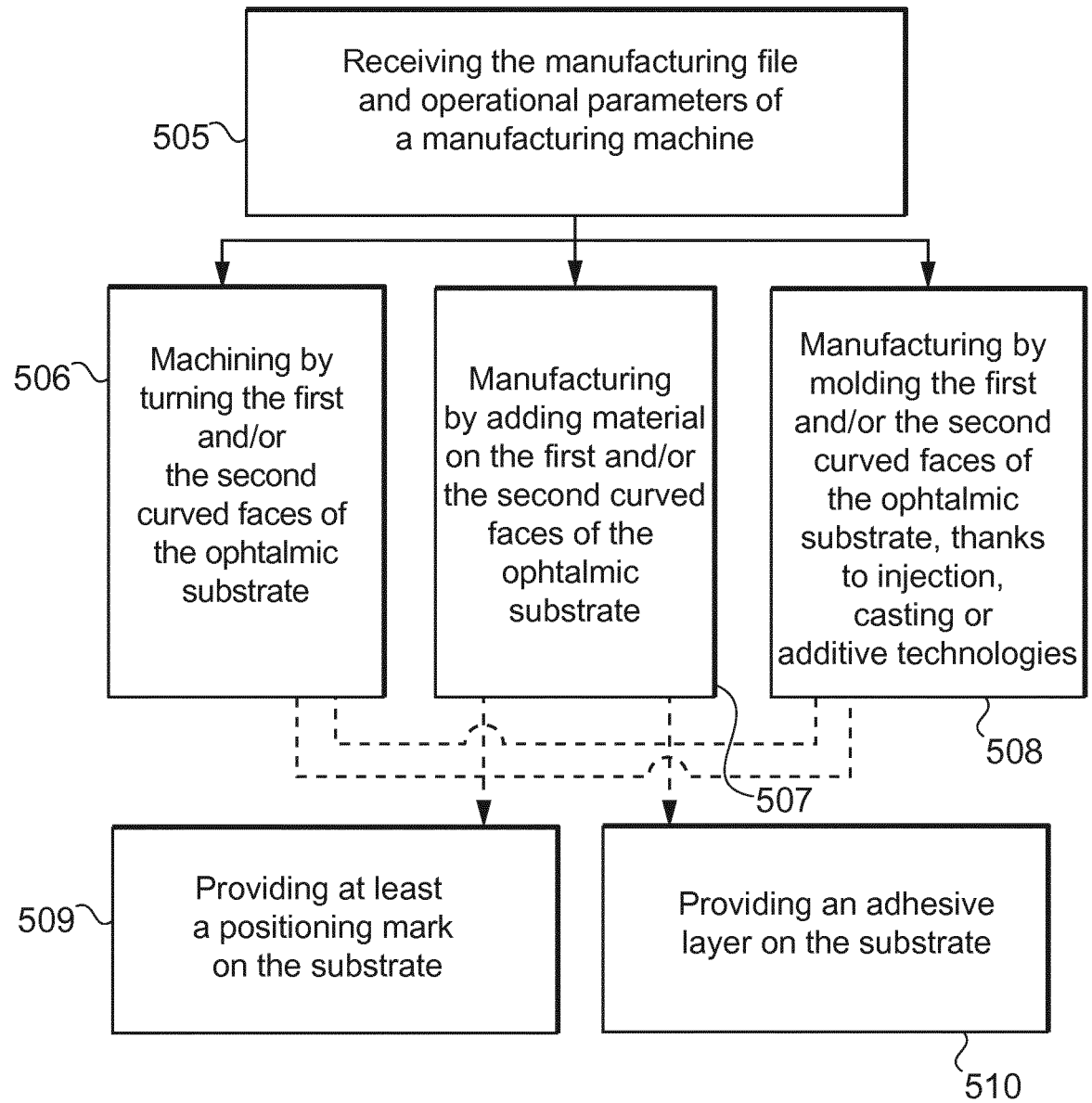

FIGS. 10 and 11 show a particular embodiment to determine second and/or third geometrical characteristics of the substrate 1 and to manufacture this substrate 1.

The method comprises the step 501 of determining by measuring the first geometrical characteristics of the first preformed face 7 of the wafer 2 and optionally the supplemental first geometrical characteristics of the first preformed face 15 of the supplemental wafer 14, with a geometrical measurement device using for instance a three-dimensionals technology or a deflectometry technology.

The method further comprises the step 502 of comparing the measured first geometrical characteristics and optionally the supplemental first geometrical characteristics, to predetermined geometrical characteristics defining the first desired shape and optionally the supplemental desired shape, in order to determine a wafer geometry error between the first geometrical characteristics and optionally the supplemental first geometrical characteristics, and the predetermined geometrical characteristics.

The method further comprises the step 503 of determining the second geometrical characteristics of the first curved face 9 of the substrate 1 to be manufactured and optionally the third geometrical characteristics of the second curved face 17 of the substrate 1 to be manufactured, according to the wafer geometry error.

The method further comprises the step 504 of generating a manufacturing file from the second geometrical characteristics and optionally from the third geometrical characteristics, and configuring operational parameters for manufacturing the first curved face 9 and optionally for the second curved surface 17.

The method further comprises the step 505 of receiving the manufacturing file and operational parameters in a manufacturing machine.

The method further comprises:
- the step 506 of manufacturing the first curved face 9 and optionally the second curved face 17 by using a turning machine; or
- the step 507 of manufacturing the first curved face 9 and optionally the second curved face 17 by using an additive machine; or
- the step 508 of manufacturing the first curved face 9 and optionally the second curved face 17 by using a molding machine, thanks to injection molding technology or casting technology or additive manufacturing technology.

The method optionally comprises the step 509 of providing at least one positioning mark (not illustrated) on the manufactured substrate 1, to facilitate the fixing step described above.

The method optionally comprises the step 510 of providing an adhesive layer on the manufactured substrate, also to facilitate the fixing step described above.

FIG. 11 shows a system for manufacturing an optical article on the basis of the ophthalmic substrate 1 and the wafer 2 and optionally a supplemental wafer 14.

The system comprises a manufacturing machine 21 and system parts generally formed by at least one control unit 22 configured to communicate with a data processing system (or control unit) of the machine 21.

The machine 21 can be a numerical-control "free-form" turning machine 1, numerical control denoting the set of equipment and software, the function of which is to give movement instructions to all the elements of the machine 1; or an additive machine configured to carry out an additive technology as mentioned above, including also a numerical control as mentioned above; or a molding machine having a molding part configured to mold the substrate thanks to injection, casting or additive technology, the molding machine having also numerical control as mentioned above.

The machine 1 comprises a tool 27 (for instance a moveable machining arm, a nozzle or a bank of nozzles, or a mold part) and a data processing system or a control unit (not shown) configured for controlling the tool 27.

The control unit 22 comprises a microprocessor 23 having a memory 24, in particular a non-volatile memory, allowing it to load and store software, in other words a computer program, which when it is executed in the microprocessor 23, allows the implementation of the manufacturing method according to the invention.

This non-volatile memory 24 is for example of the ROM ("read only memory") type.

The control unit 22 further comprises a memory 25, in particular a volatile memory, allowing data to be stored during the execution of the software and the implementation of the method.

This volatile memory 25 is for example of the RAM or EEPROM type (respectively "random access memory" and "electrically erasable programmable read only memory").

The control unit may be only at least partially integrated into the machine. In other words, the control unit may be arranged in part, or in whole, outside the machine.

The control unit can form at least partially a part of the machine and may comprise one or a plurality of control modules located inside and/or outside the machine.

The machine 21 can be configured for polishing the faces and/or for edging the peripheral edge in order to form the ophthalmic lens.

The control unit 20 is configured to control at least some of the steps of the manufacturing method described above.

Figure 12:
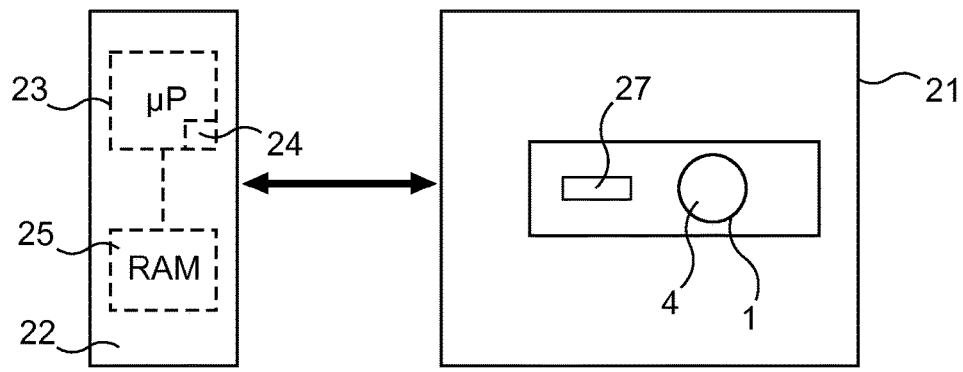
FIG. 12 is a partial and schematic view of a system for manufacturing such an ophthalmic article as illustrated in FIGS. 1 to 4, comprising a manufacturing machine and system parts configured for carrying out at least some steps of the method according to the invention.
Figure 13:
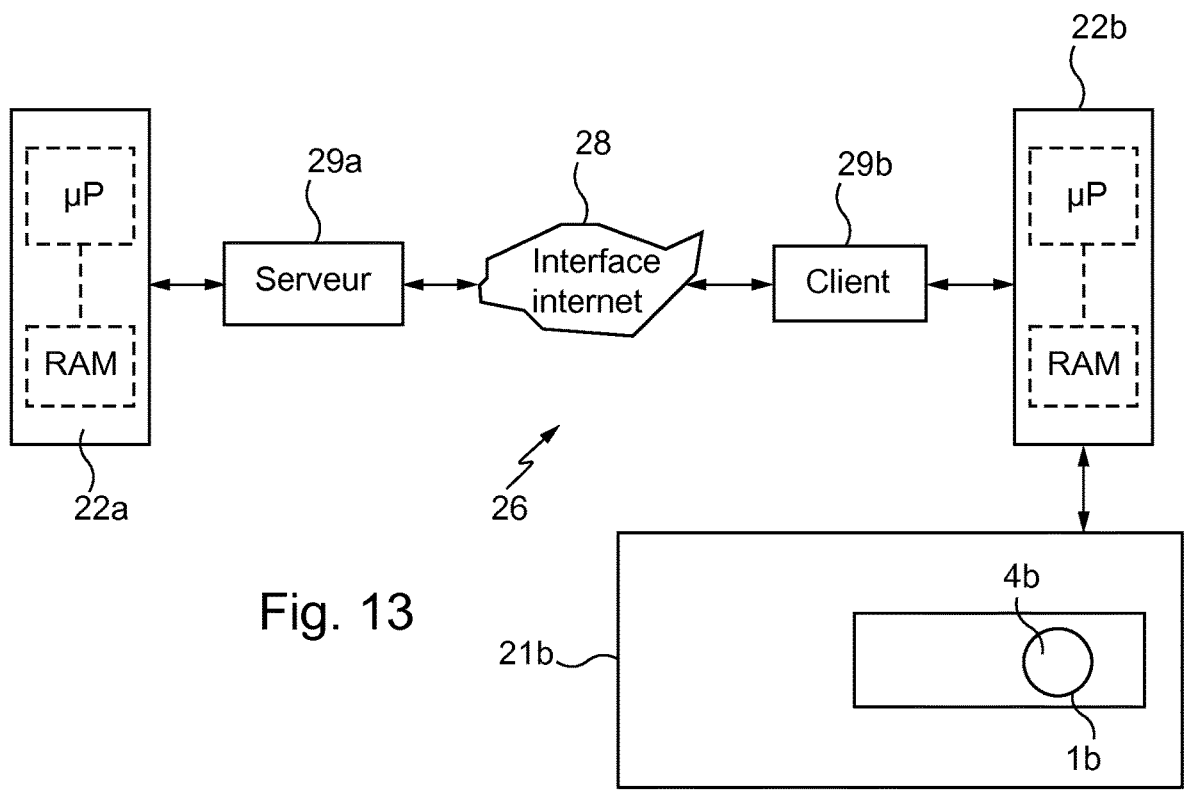
FIG. 13 diagrammatically shows a client-server communication interface comprising system parts configured for transferring at least configuration parameters determined by the method according to the invention to a remote data processing system.

FIG. 12 shows a client-server communication interface 26 comprising a so-called supplier side 29*a* and another, so-called client side 29*b*, and these two sides communicating via an internet interface 28.

The supplier side comprises a server 29a linked to a data processing system or a control unit 22a of the same type as that in FIG. 11, this server 29a being configured to communicate with the internet interface 28.

The client side 29b is configured to communicate with the internet interface 28, and is linked to a data processing system or a control unit 22b of the same type as that of the supplier side.

Further, the client-side control unit 22b is linked to a manufacturing machine 21b of the same type as that in FIG. 11 for manufacturing at least the first face 4b the ophthalmic substrate 1b.

The control unit 22b is configured for receiving, on the client side, for instance the first geometrical characteristics of the wafer and optionally the supplemental first geometrical characteristics of the supplemental wafer.

The control unit 22b, using the internet 28 and server 29a interface, sends the data received to the supplier-side control unit 22a for the determination of the manufacturing file and operational parameters.

The control unit 22a executes the computer program that it contains in order to implement the method according to the invention and thus deduce the manufacturing file and operational parameters.

Using the server 29a and the internet interface 28, the control unit 22a sends the manufacturing file and operational parameters to the client-side data control unit 22b.

The control unit 22b is configured to execute software for implementing a method for manufacturing the substrate 1b by using the manufacturing file and operational parameters.

In variant which are not illustrated:
- the first curved face on which the preformed functional wafer is applied can be concave rather than convex and/or the second curved face on which the supplemental preformed functional wafer is applied can be convex rather than concave;
- the substrate can be a support for an ophthalmic lens without prescription, generally called plano lens, and used for instance in order to form solar lens and, in this case, the substrate may intrinsically comprise a predetermined function, for instance of filtration;
- the wafer can be made from a single layer or from a plurality of layers, the layers being different from each other or at least some of the layers being similar;
- the wafer can have a desired shape which is spherical, or toric, or pseudo-spherical and configured to provide a desired addition of optical power to the ophthalmic article;
- the adhesive layer can be made from a single layer or from a plurality of layers;
- the adhesive layer can be formed for instance by a pressure sensitive adhesive or by a hot melt adhesive; and/or
- the modified face of the substrate and/or the face of the wafer can be cleaned and/or activated before the step of fixing such faces together.

The invention claimed is:

1. A method for manufacturing an ophthalmic article including a substrate and a functional wafer securely fastened to a first curved face of said substrate, said manufacturing method comprising:
   providing said functional wafer preformed according to a first desired shape, the preformed functional wafer having a first preformed face configured to be applied on said first curved face of said substrate, said first preformed face being defined by first geometrical characteristics;
   determining second geometrical characteristics of the first curved face of said substrate to be manufactured according to the first geometrical characteristics of said first preformed face of said preformed functional wafer;
   manufacturing said first curved face according to the determined second geometrical characteristics from a flat surface of the substrate that is a semi-finished lens; and
   fixing said preformed functional wafer to said substrate by applying the first preformed face on the first curved face in order to form said ophthalmic article, wherein the preformed functional wafer is one of a film and a mineral shell.

2. The method according to claim 1, further comprising determining the first geometrical characteristics of said first preformed face.

3. The method according to claim 2, wherein determining said first geometrical characteristics is performed with a geometrical measurement device using one of a three-dimensional method and a deflectometry method.

4. The method according to claim 3, further comprising:
   measuring said first geometrical characteristics;
   comparing said first geometrical characteristics to predetermined geometrical characteristics defining said first desired shape in order to determine a wafer geometry error between said first geometrical characteristics and said predetermined geometrical characteristics; and
   determining said second geometrical characteristics of the first curved face of said substrate to be manufactured according to said wafer geometry error.

5. The method according to claim 1, further comprising:
   generating a manufacturing file from said second geometrical characteristics; and
   configuring operational parameters to manufacture said first curved face of said substrate.

6. The method according to claim 5, wherein manufacturing the first curved face of said substrate is performed by using one of a turning machine and an additive machine, the turning machine being configured to receive said operational parameters.

7. The method according to claim 5, wherein manufacturing the first curved face of said substrate is performed by using a molding machine provided with a mold part having an internal face formed according to said second geometrical characteristics, the first curved face being formed in said mold part by one of injection molding, casting, and additive manufacturing.

8. The method according to claim 1, wherein said substrate has a second curved face opposite to the first curved face,
   the method further comprising determining third geometrical characteristics of said second curved face according to one or more of: (i) the first geometrical characteristics of said first preformed face of said preformed functional wafer, and (ii) the second geometrical characteristics of said first curved face; and
   manufacturing said second curved face according to the determined third geometrical characteristics.

9. The method according to claim 8, further comprising:
   providing a supplemental functional wafer preformed according to a predetermined shape, the preformed supplemental functional wafer having a supplemental first preformed face configured to be applied on the second curved face of said substrate, said supplemental first preformed face being defined by supplemental first geometrical characteristics, one or more of: (i) said second geometrical characteristics of said first curved face, and (ii) said third geometrical characteristics of said second curved face being determined according to said supplemental first geometrical characteristics; and fixing said preformed supplemental functional wafer with said substrate by applying the supplemental first preformed face on the second curved face in order to form said ophthalmic article.

10. The method according to claim 1, wherein at least one of said preformed functional wafer and manufactured substrate has an adhesive layer to fix thereof.

11. The method according to claim 1, further comprising:
providing positioning marks on at least one of said preformed functional wafer and manufactured substrate; and
positioning said preformed functional wafer with respect to said manufactured substrate according to said positioning marks to fix thereof.

12. The method according to claim 1, wherein the first desired shape of said functional wafer is defined at least by a radius of curvature.

13. The method according to claim 1, further comprising preforming said functional wafer by one or more of: (i) thermoforming, and (ii) applying a gradient of pressure.

14. A non-transitory computer-readable medium on which is stored a program comprising instructions which, when executed by a computer, causes the computer to perform the method according to claim 1.

15. The method according to claim 2, further comprising:
generating a manufacturing file from said second geometrical characteristics; and
configuring operational parameters to manufacture said first curved face of said substrate.

16. The method according to claim 3, further comprising:
generating a manufacturing file from said second geometrical characteristics; and
configuring operational parameters to manufacture said first curved face of said substrate.

17. The method according to claim 2, wherein said substrate has a second curved face opposite to the first curved face,
the method further comprising determining third geometrical characteristics of said second curved face according to one or more of: (i) the first geometrical characteristics of said first preformed face of said preformed functional wafer, and (ii) the second geometrical characteristics of said first curved face; and
manufacturing said second curved face according to the determined third geometrical characteristics.

18. The method according to claim 1, wherein the manufacturing the first curved face is carried out so that ophthalmic properties of the substrate are maintained or is carried out to provide specific ophthalmic properties.

* * * * *